United States Patent [19]
Cornford et al.

[11] Patent Number: 6,155,294
[45] Date of Patent: Dec. 5, 2000

[54] DRY DISCONNECT COUPLING WITH IMPROVED POPPET SEAL

[75] Inventors: Arthur Selwyn Cornford, Mississauga; Stanley Robert Elsdon, Etobicoke; Gordon Elford Fairles, Toronto, all of Canada

[73] Assignee: Emco Wheaton Fleet Fueling, Corp., Oakville, Canada

[21] Appl. No.: 09/285,467

[22] Filed: Apr. 2, 1999

[51] Int. Cl.[7] .................................................. F16L 37/28
[52] U.S. Cl. ...................................... 137/614; 137/614.06
[58] Field of Search .............................. 137/614, 614.06, 137/614.04, 614.02, 614.03, 614.05; 251/357

[56] References Cited

U.S. PATENT DOCUMENTS 5,273,071 12/1993 Oberrecht .
5,404,909  4/1995 Hanson .............................. 137/614.06
5,628,344  5/1997 Roberts .

Primary Examiner—Kevin Lee
Attorney, Agent, or Firm—Evenson, McKeown, Edwards & Lenahan, P.L.L.C.

[57] ABSTRACT

A dry disconnect coupling for connecting one fluid conduit to another fluid conduit to form a continuous flow path, the coupling including a receptacle and a coupler, each being secured to a respective conduit or container. The receptacle and the coupler are secured and locked together to provide a connection for transfer of fluids. A poppet valve is provided and seated in each of the receptacle and the coupler for sealing a respective flow passageway therein when the coupling is uncoupled. The receptacle poppet valve and the coupler poppet valve can be unseated to permit flow of fluid through the coupling when the coupling is coupled and locked. The poppet valve of the receptacle has resilient annular seal member in its poppet sealing surface. The coupler body and poppet and the receptacle body and poppet are provided with a resilient annular seal member at their interfaces; the coupler poppet is self-aligning, and the arrangement of the seal member and the geometry of the coupler body and poppet and the receptacle body and poppet are such that a small interface between the two poppets is provided, so that only a minimal volume of fluid remains in the coupling after uncoupling.

7 Claims, 4 Drawing Sheets

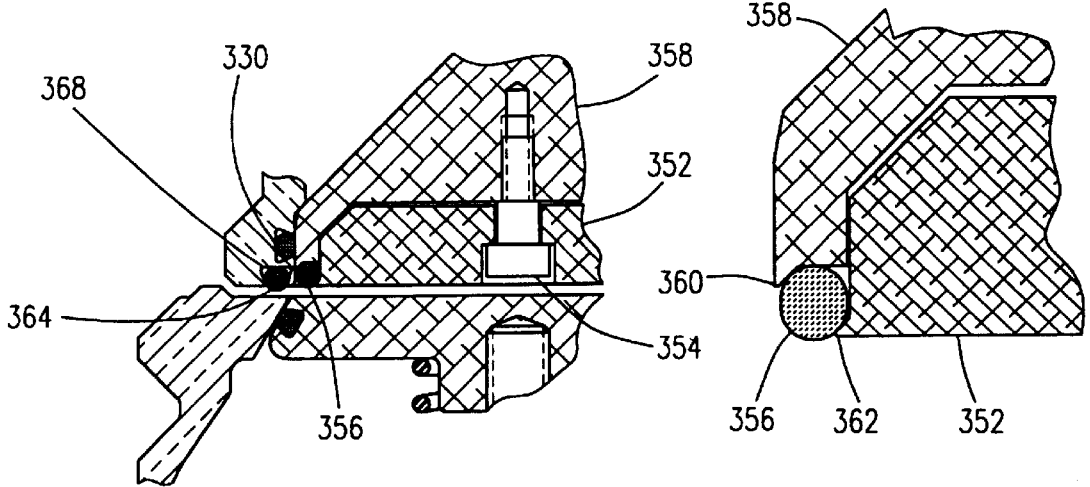
FIG. 6
FIG. 9
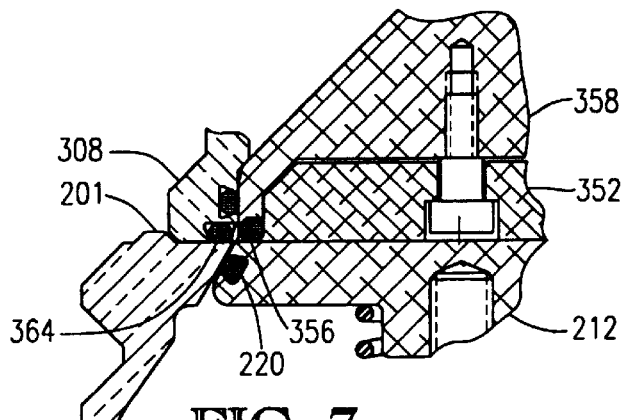
FIG. 7
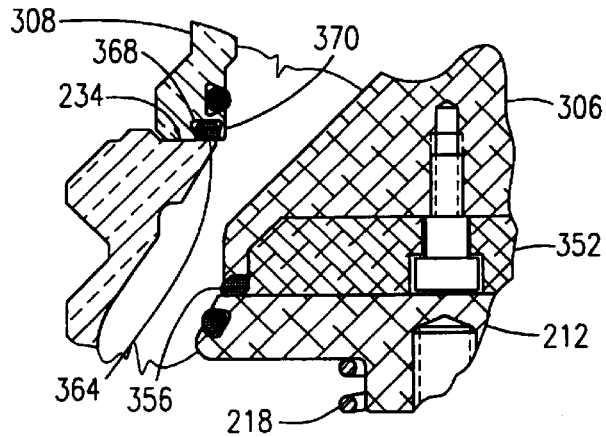
FIG. 8

DRY DISCONNECT COUPLING WITH IMPROVED POPPET SEAL

FIELD OF THE INVENTION

The present invention relates to improvements in dry disconnect couplings.

BACKGROUND OF THE INVENTION

Dry disconnect couplings, also commonly called dry-break couplings, are used in various applications to connect one fluid conduit to another to form a continuous flow path. Typically, dry disconnect couplings comprise a receptacle and a coupler. The receptacle may be mounted on a fluid conduit, or may form the inlet to, or outlet from, a fluid container such as a storage tank. The coupler may be mounted on a fluid conduit and means are provided for mechanically locking the coupler and receptacle together to provide an environmentally sealed connection for the transfer of fluids.

The receptacle and coupler each have a flow passageway, which is sealed by a poppet valve when the coupling is uncoupled. When the coupler is locked on to the receptacle, the poppets are displaced from their seats to permit flow of fluid through the coupling. Mechanical interlocks are provided to prevent separation of the two components unless the poppets are returned to their closed position. There are many designs of dry disconnect couplings in existence. Examples of such couplings are those disclosed in U.S. Pat. No. 5,273,071 issued to David A. Oberrecht and U.S. Pat. No. 5,628,344 issued to Robert D. Roberts.

As the name implies, dry disconnect couplings used in liquid transfer operations are intended to prevent spillage of liquid when the two components of the coupling are uncoupled. In practice, some small quantity of liquid is spilled each time the coupling is disconnected. Oberrecht states that prior disconnect couplings of this type, used in a four inch conduit, can limit the loss of liquid to something of the order of ⅔ of an ounce for each disconnection and as he points out, this can result in potentially hazardous soil contamination over an extended period of use. Various authorities can be expected to attempt to regulate this environmental risk. For example, a draft of an Association of American Railroads Locomotive Fueling Interface Standard requires that the liquid spilled during a disconnect of a three inch coupling when tested shall be less than 5 cubic centimeters (i.e. ⅙ fluid ounces) for each test.

The primary source of spillage is the liquid remaining in the annular space between the periphery of the poppets and the circumferential seal between the coupler and the receptacle, when the poppets are retracted to the closed position. A secondary source of spillage is liquid, which may enter into the space between the opposed faces of the poppets when they are displaced in the open position and which remains there when the poppets are retracted. This space is the result of misalignment between the poppet faces, manufacturing imperfections, or damage to the poppet faces, or a combination of these causes. Oberrecht provides an O-ring mounted in a groove formed in the face of the coupler poppet which forms a seal against the face of the receptacle poppet to prevent the interface being wetted when the poppets are in the open position. Liquid residue may still remain around the periphery of this seal. Oberrecht also reveals an alternative method in which a sealing ring of rectangular cross section is bonded to the face of the coupler poppet with the purpose of minimizing the annular gap around the periphery of the poppet. The cross section of this seal is much less resilient than the O-ring and is less suitable for the function desired. Furthermore, being bonded in place, it is difficult to replace when this becomes necessary. Roberts accepts the aforementioned deficiencies and provides a reservoir to collect any spillage and a means to return it to the flow path. It will be noted that this return flow is induced by the passage of liquid through the coupling and ceases when the poppets are closed.

SUMMARY OF THE INVENTION

The present invention provides a dry disconnect coupling for connecting one fluid conduit to another fluid conduit to form a continuous flow path, said coupling comprising a receptacle and a coupler, each being secured to a respective conduit or container, with means for securing and locking the receptacle and the coupler together to provide a connection for transfer of fluids, a poppet valve seated in each of the receptacle and the coupler for sealing a respective flow passageway therein when the coupling is uncoupled, and which valves can be unseated to permit flow of fluid through the coupling when the coupling is coupled and locked;

the poppet valve of the receptacle having resilient annular sealing means in its poppet sealing surface;

the coupler body and poppet and the receptacle body and poppet being provided with resilient annular sealing means at their interfaces, the coupler poppet being self-aligning, the arrangement of the sealing means and the geometry of the coupler body and poppet and the receptacle body and poppet being such that a small interface between the sealing means is provided whereby only a minimal volume of fluid remains in the coupling after uncoupling.

In a preferred form of the coupling, the coupler has resilient sealing means around the periphery of the interface between the coupler and the receptacle which comprises a resilient annular seal in the end face of a sleeve located within the coupler body and two additional resilient annular seals provided between the coupler body and the sleeve and between the sleeve and the coupler poppet, respectively, to contain fluid under pressure; and when the coupler poppet is closed to its fully retracted position, a mating portion of the poppet body engages a corresponding mating portion of the sleeve and causes the sleeve to retract slightly, thus disengaging the face of the resilient annular seal from its contact with the receptacle and providing a small clearance between the two poppets to ensure no mechanical interference between the poppets; and the coupler poppet being self-aligning to compensate for any misalignment of the poppet faces; the arrangement of the seals in the coupling and the small interface between the sealing means being such that only a minimal volume of residual fluid remains in the coupling after disconnection of the coupler and the receptacle.

It will be apparent that the coupling of the present invention provides a dry disconnect coupling in which spillage of liquid is minimized by a) providing an effective method of preventing the wetting of the entirety of the poppet faces and b) reducing the annular space around the periphery of the poppet seals to a minimum.

An additional advantage of the coupling of the present invention is that maintenance and replacement of the coupler poppet head and seal are easily accomplished without the need to remove internal fluid pressure from the coupler.

The present coupling includes means for mechanically locking the two components together before and during fluid transfer using technology known in the art.

DESCRIPTION OF PREFERRED EMBODIMENTS

In a preferred embodiment, the receptacle is sealed by a spring loaded poppet, the poppet having a frusto-conical sealing surface which is seated on a matching frusto-conical seat in the receptacle body. Other suitable shapes may be selected for the sealing surfaces. The effectiveness of the sealing arrangement just described is increased by resilient sealing means, for example, an O-ring which resides in a groove in the poppet sealing surface. Preferably, the geometry of the receptacle poppet and body are such that the face of the poppet is flush with the adjacent face of the body when the poppet is in the closed position.

In a preferred embodiment, the coupler incorporates resilient sealing means that preferably comprises an O-ring which provides an environmental seal around the periphery of the interface between the coupler and receptacle when the two are conjoined and locked together in condition for fluid transfer. This face seal is preferably carried in a groove in the end face of a sleeve within the body of the coupler, the face seal sleeve being spring-loaded to force the seal against a corresponding face on the receptacle body. Two additional adjacent, annular seals, preferably O-ring seals are used to seal between the coupler body and the face seal sleeve and between the face seal sleeve and the coupler poppet to contain liquid under pressure. When the coupler poppet is closed to the fully retracted position, a mating portion, for example a shoulder on the poppet body engages a corresponding mating portion, for example a corresponding register on the face seal sleeve and causes the sleeve to retract slightly thus disengaging the face O-ring seal from its contact with the receptacle. There is also, under this condition, a small clearance between the two poppets which is provided so that engagement between the coupler and the receptacle may take place without mechanical interference between the poppets as a result of dimensional discrepancies among the various components.

Further, in a preferred embodiment self-alignment of the coupler poppet is achieved as follows. The face of the coupler poppet is not rigidly attached to the poppet body but is freely located in a recess in the end of the poppet body and is loosely retained by means of a screw on the axial centreline so that the poppet head can move axially and may tilt in any direction to align itself with the receptacle poppet when the two poppets come into contact. The surface of the poppet head is extended circumferentially to form a small flange which acts to retain an O-ring against the main body of the poppet. The geometry of the components is such that the outside diameter of the O-ring is approximately the same as the diameter of the poppet body and the face of the O-ring is slightly proud of the surface of the poppet head. Consequently, when the coupler poppet is pressed against the face of the receptacle poppet, the coupler poppet head tilts to align face-to-face with the receptacle poppet and at the same time the O-ring is compressed between the coupler poppet body and the receptacle poppet. By this means, any intrusion of liquid between the two poppet faces is prevented.

It should be asked that all resilient sealing means may be made from the same suitably resilient material, examples of which include Viton™, BUNAN™, a nitron or fluorocarbon material Operation of the Dry Disconnect Coupling In sequence of operation, when coupling is effected between the coupler and the receptacle and the two are locked together, the coupler mechanism is activated causing the coupler poppet to extend and this in turn allows the face seal sleeve spring to force the sleeve to extend until the face seal is forcibly pressed against the face of the receptacle thus effecting an environmental seal against leakage of liquid from within the coupling. Coincidentally, the coupler poppet head seal is compressed against the receptacle poppet as described earlier. Further extension of the coupler poppet causes the receptacle poppet to open simultaneously until the coupling is fully open. In the reverse sequence of events, as the poppets are closing, at the point at which the receptacle poppet has closed, the coupler face seal is still compressed against the face of the receptacle body and the coupler poppet head seal is still compressed between the two poppets. At this time, the seal between the coupler body and the face seal sleeve prevents liquid from entering the interspace between this seal, the coupler face seal and the coupler poppet head seal. The quantity of liquid remaining in this circumferential interspace is the amount of spillage which will take place when the coupling is uncoupled. The volume of the interspace is kept to an absolute minimum by a geometry which places the three seals as close together as is practical from a manufacturing point of view. When used in a three inch conduit, the theoretical volume of the interspace is approximately 0.26 cubic centimeters. In practice, allowing for manufacturing tolerances, misalignment of the coupling members, etc., a spillage of not more than 1 cubic centimeter is anticipated.

It will be apparent from the arrangement of parts already described, that the coupler poppet head seal and the poppet head, in addition to the coupler face seal, can be maintained or replaced without the need to remove internal fluid pressure from the coupler.

It may also be noted that while, in conventional practice, flow through the dry disconnect coupling is from the coupler to the receptacle, flow may readily take place in the opposite direction with all components of the coupling performing the same functions.

BRIEF SUMMARY OF THE DRAWINGS

FIG. 6 is a fragmentary sectional view at an enlarged scale of a coupler poppet and a receptacle poppet and seals employed in the coupling of FIG. 1

FIG. 7 is a fragmentary sectional view at an enlarged scale of the poppets and seals of FIG. 6 with the coupler poppet extended to make contact with the receptacle poppet.

FIG. 8 is a fragmentary sectional view at an enlarged scale of the poppets and seals of FIG. 6 with the coupler poppet and the receptacle poppet displaced to partially open the coupling of FIG. 1.

FIG. 9 is a fragmentary sectional view at a much enlarged scale of a coupler poppet and seal employed in the coupler of FIG. 2.

DETAILED DESCRIPTION OF THE DRAWINGS

Figure 1:
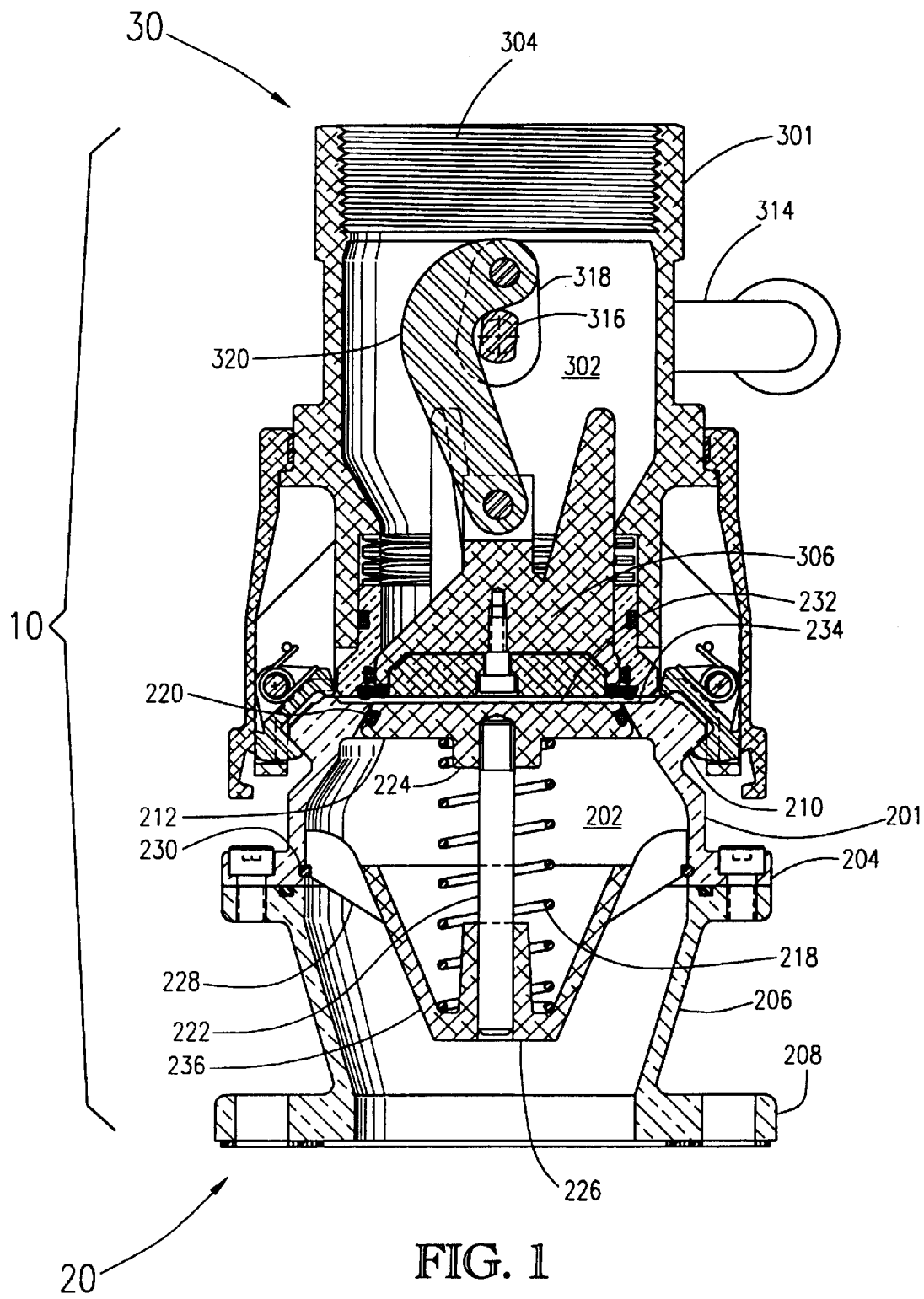
FIG. 1 is a sectional view of a dry disconnect coupling according to the invention showing the coupler connected to the receptacle and the poppets of the coupler and the receptacle closed.
Figure 5:
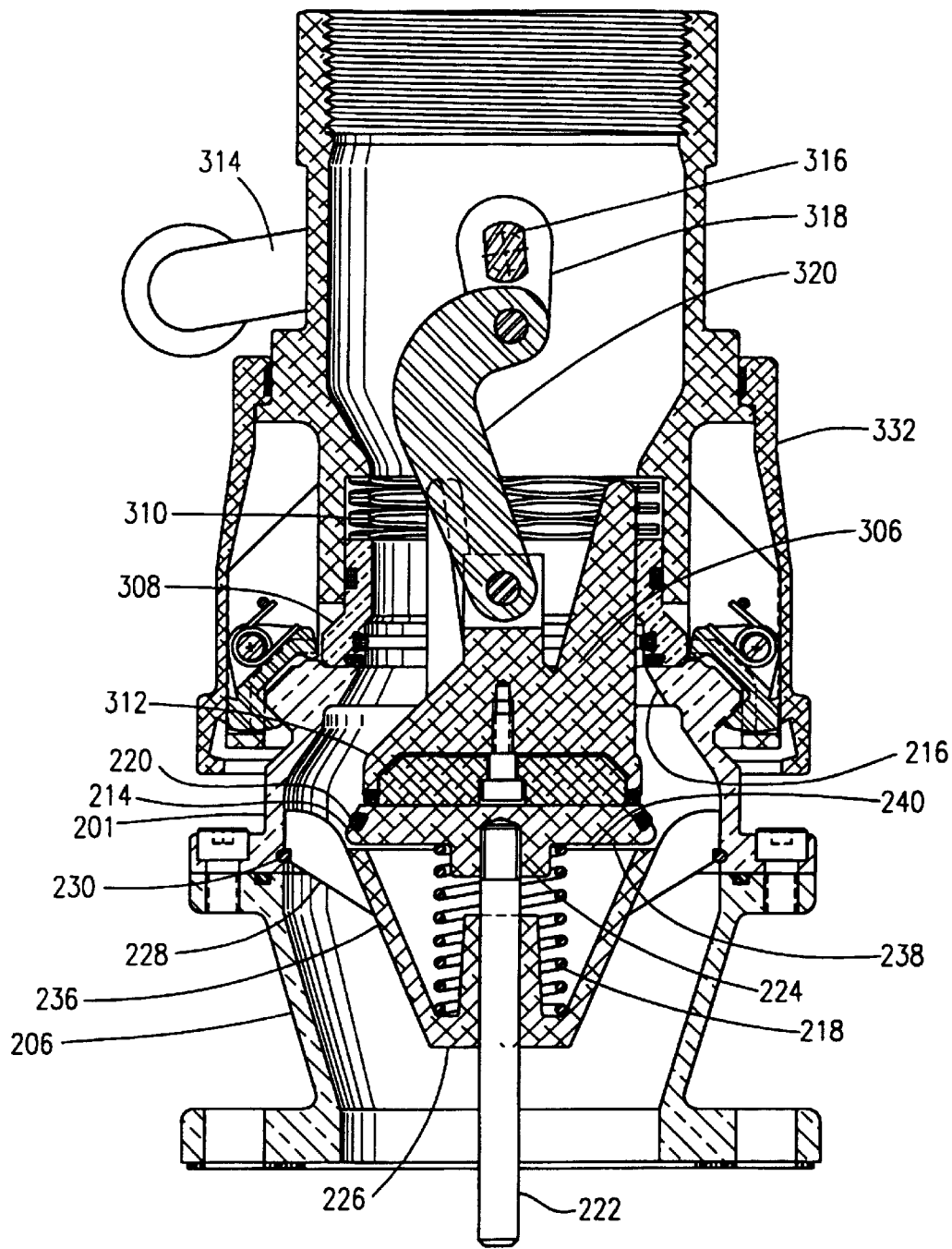
FIG. 5 is a sectional view of a dry disconnect coupling according to the invention showing the coupler connected to the receptacle and the poppets of the coupler and the receptacle fully open.

Referring to the drawings, FIG. 1 illustrates a dry disconnect coupling according to the invention, indicated generally at 10. The coupling comprises two separable components, a receptacle indicated generally at 20 and a coupler indicated generally at 30. As best shown in FIG. 1 and FIG. 5, the receptacle comprises a generally cylindrical body, 201 defining a flow passageway 202 therethrough. Body 201 comprises a flange 204 for attaching one end of the body to a body extension 206 which in turn comprises a flange 208 for attaching the receptacle to the end of a fluid conduit (not shown), or preferably to the inlet of a vehicle fuel tank (not shown). The other end of body 201 comprises an annular flange 210 for attaching the coupler 30 to the receptacle 20.

Receptacle 20 further comprises a poppet valve 212 for sealing the flow passageway 202. Poppet 212 comprises a frusto-conical sealing surface 214 biased by a spring 218 against a mating frusto-conical surface 216 at the end of the receptacle 20. An O-ring seal 220 seals surface 214 and surface 216 when the poppet valve 212 is closed. O-ring 220, typically, is preferably formed of a resilient elastomeric material which is not degraded by petroleum products or other liquids which may flow through the coupling when in service. When poppet valve 212 is closed, poppet end surface 232 and body end surface 234 are proximate to the same plane, normal to the axis of receptacle 20. Poppet 212 further comprises a cylindrical guide rod 222 which is threadably attached to a hub 224 forming part of poppet 212 and is axially concentric with poppet 212. Guide rod 222 is slidably engaged with a hub 226 which comprises a frusto-conical extension 236 and a plurality of radial ribs 228 that are secured to the interior of body 201 by means of retaining ring 230.

When poppet valve 212 is fully open (FIG. 5) the posterior surface 238 of poppet 212 is in close proximity to the end 240 of hub extension 236 so that the alignment of poppet surface 214 and the exterior surface of hub extension 236 define a profile resulting in low resistance to flow of liquid through the receptacle.

Figure 2:
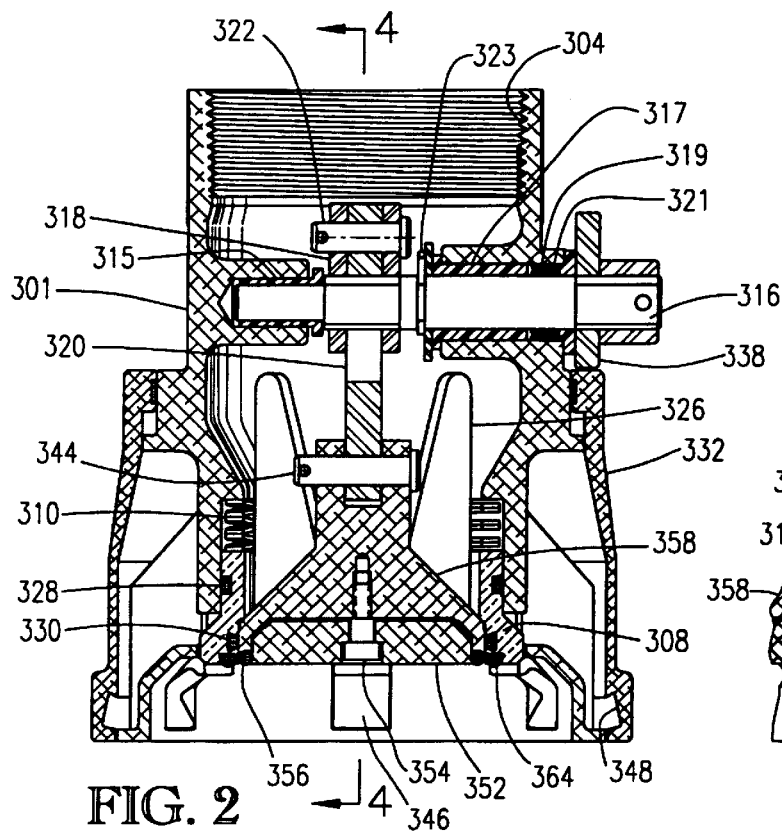
FIG. 2 is a sectional view of the coupler of the coupling of FIG. 1 taken in a plane normal to the plane of FIG. 1 showing the coupler in its disconnected state.
Figure 4:
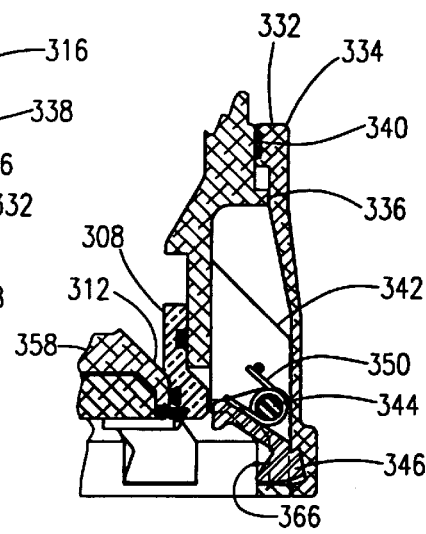
FIG. 4 is a fragmentary sectional view taken on line 4—4 in FIG. 2
Figure 3:
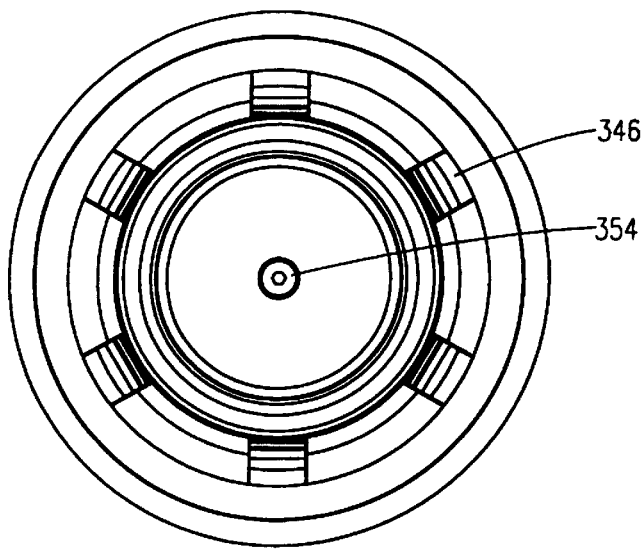
FIG. 3 is an end elevational view of the coupler of FIG. 2 taken from the proximate side of FIG. 2.

Description of the coupler 30 is best understood by reference to FIG. 1, FIG. 2 and FIG. 4. The generally cylindrical coupler body 301 defines a flow passageway 302 therethrough. The open internally threaded port 304 of the coupler is adapted for attachment of a fluid conduit (not shown) preferably the supply pipe from a diesel fueling pump (not shown). Coupler 30 further comprises a poppet valve 306 for sealing the flow passageway and a poppet actuating mechanism comprising lever 314, shaft 316, cranks 318 and link 320. Shaft 316 is journaled on coupler body 301by means of bearings 315 and 317. O-ring seals 319 and 321 seal shaft 316 and body 301. Shaft 316 is retained in body 301 by hairclip clip 323 which resides in a groove in shaft 316. Lever 314 and cranks 318 are mounted in locked angular relationship on shaft 316. One end of link 320 is pivotally connected between cranks 318 by means of pin 322 and the other end of link 320 is pivotally connected to poppet 306 by means of pin 344 so that rotation of lever 314 actuates poppet 306 from its closed position to its fully open position, and subsequent reverse rotation of lever 314 retracts poppet 306 to its closed position.

An annular nose seal ring 308 is interposed between poppet 306 and the inner surface of body 301. O-ring seal 328 seals ring 308 and body 301. Poppet 306 has three longitudinal guide arms 326 which engage the inner surface of nose seal ring 308 to guide the poppet throughout its axial movement relative to the passageway 302. Nose seal ring 308 is biased by a wave spring 310 against a shoulder 312 on poppet 306 such that ring 308 moves with the poppet relative to body 301. When poppet 306 is in the closed position, the poppet and nose seal ring 308 are sealed by O-ring 330.

Poppet 306 comprises poppet body 358 and poppet head 352. Poppet head 352 is slidably retained in a recess in poppet body 358 by shoulder screw 354, the proportions of the parts being such that a clearance, typically of the order of 0.020 inches, remains between the back surface of poppet head 352 and the adjacent surface of poppet body 358. The clearances between poppet head 352, poppet body 358 and shoulder screw 354 allow poppet head 352 to tilt slightly when subject to external forces. Reference to FIG. 6 and FIG. 9 clearly reveals the geometric relationship between the poppet components. O-ring 356 is retained between annular projecting lip 360 on poppet body 358 and annular projecting lip 362 on poppet head 352 and, due to its resilient properties, forces poppet head 352 to be seated against the shoulder of shoulder screw 354. O-ring 364 is retained in an annular groove 368 concentric with the coupler axis to form a face seal on the end face of nose seal ring 308. The thickness of the annular wall between groove 368 and the inner face 370 (FIG. 8) is typically of the order of 0.040 in. and as is apparent from reference to FIG. 6, when the poppet valve 306 is closed, the proximity of O-ring seals 330, 356 and 364 is as close as may be achieved by normal manufacturing methods.

Body 301 further comprises, at its lower extremity a plurality of outturned brackets 342 (FIG. 4), disposed in pairs which are spaced equidistant around the circumference of body 301. Each pair of brackets 342 is drilled in line to accommodate a pivot pin 344. Between each pair of brackets 342 a latching dog 346 is pivotally mounted on pivot pin 344. External to body 301 an annular latch sleeve 332 comprises an inturned flange 334 which limits travel of sleeve 332 between body flange 336 and cam 338, the latter being mounted on shaft 316 in locked angular relationship with lever 314 and cranks 318. A dust seal 340, preferably made of teflon or similar material with low friction properties, is retained in a groove in flange 334 and seals sleeve 332 and body 301. An annular groove 348 is machined on the inner surface of sleeve 332 in a location such that when sleeve 332 is fully retracted, each latching dog 346 is urged by a torsion spring 350 to engage in groove 348 thereby preventing displacement of sleeve 332 from its retracted position when coupler 30 is not engaged with receptacle 20. When sleeve 332 is fully retracted as described, shaft 316 is prevented from rotation as a result of the proximity of cam 338 and sleeve 332. When coupler 30 is offered up to receptacle 20 in the act of coupling the two together, the noses of latch dogs 346 contact the end of receptacle body 201 causing the latch dogs to pivot on pins 344 thereby disengaging from groove 348 and allowing the operator to displace latch sleeve 332 to the limit of its extended travel, as determined by contact between flange 334 and body flange 336, at which point, the inner surface of latch sleeve 332 restrains latch dogs 346 from rotation outward against the force of torsion springs 350. Concurrently, the rotation of latch dogs 346 causes the face 366 on each latch dog to bear against the back face of receptacle flange 210 thus causing coupler 30 to be securely attached to receptacle 20. It will be noted that when the coupler 30 and receptacle 20 are locked together in coupled relation, the poppets 306 and 212 are axially aligned with their outer end faces in opposed contiguous relation.

With reference to FIG. 5, fully extended displacement of latch sleeve 332 as described allows rotation of cam 338 and coincidentally lever 314 and cranks 318, the latter transmitting motion to links 320 and thereby causing poppet valve 306 to open. The profile (not shown) of cam 338 is such that when lever 314 is rotated from its closed position as shown in FIG. 1 to its open position, retraction of latch sleeve 332 is prevented by the proximity of a lobe of cam 338. When the poppets are fully open, shoulder 312 no longer restricts axial movement of nose seal ring 308 and the latter is urged by wave spring 310 to compress O-ring 356 against receptacle body end surface 234 (FIG. 8), thus providing an environmental seal at the interface of coupler 30 and receptacle 20.

The efficacy of the invention in providing a sealing method with minimal leakage to the environment becomes obvious by referring to FIG. 6, FIG. 7 and FIG. 8. In FIG. 6, as has been previously described, the poppets of the receptacle and coupler are shown in the closed state corresponding to that of FIG. 1 in which coupler 30 and receptacle 20 are coupled and locked together.

In FIG. 7, as a result of lever 314 having been rotated slightly away from the closed position (FIG. 1), coupler poppet head 352 and receptacle poppet 212 are in direct contact, O-ring seal 356 is slightly deformed against receptacle poppet 212 as a result of force applied by coupler body 358, nose seal ring 308 is in contact with receptacle body 201, and O-ring 364 is deformed against receptacle body 201 as a result of force applied by wave spring 310 through nose seal ring 308.

In FIG. 8, as a result of lever 314 being subject to further rotation towards the open position (FIG. 5), the resulting axial displacement of coupler poppet valve 306 is transferred to receptacle poppet 212 against the reactive force of spring 218. As the interface between coupler poppet 306 and receptacle poppet 212 consists of poppet head 352 and O-ring 356, the force applied by spring 218 causes poppet head 352 to be displaced towards the bottom of the recess in poppet body 358 and O-ring 356 to be further deformed so that its effectiveness in sealing the two poppets is increased. It will be evident that any misalignment or surface damage on either or both poppets is compensated for by the self-alignment of poppet head 352 within its recess and the resilience of O-ring 356 so that it is impossible for liquid to enter the interspace between the two poppets when the coupling is open for the transfer of liquid as shown in FIG.5.

The coupler is disengaged from the receptacle by following a reverse procedure to that previously described for coupling them. Lever 314 is rotated from its open position as shown in FIG. 5 to its closed position as shown in FIG. 1. The resulting rotation of shaft 316 and crank 318 displaces link 320 thus causing poppet 306 to travel axially to its closed position as shown in FIG. 1 and FIG. 6. Concurrently, receptacle poppet 212 is urged by spring 218 to maintain contact with coupler poppet 306 until poppet surface 214 contacts receptacle body surface 216 and the surfaces are sealed by O-ring 220. When lever 314 is rotated fully to the closed position as shown in FIG. 1, cam 338 is disposed as shown in FIG. 2 to permit latch sleeve 332 to be displaced to its fully retracted position. When latch sleeve 332 is fully retracted, torsion springs 350 urge latch dogs 346 to rotate on pivot pins 344 and consequently, to snap into groove 348 (FIG. 4), thus preventing further axial movement of latch sleeve 332. Further, the rotation of latch dogs 346 causes latch dog faces 366 to move away from the back face of receptacle flange 210, thus unlocking the coupling and allowing coupler 30 to be withdrawn from contact with receptacle 20.

It will be recalled that when both poppets are fully closed, prior to the act of uncoupling, a gap exists between the opposing poppet faces as shown in FIG. 6. However, briefly before this gap occurs, a condition exists as illustrated in FIG. 7, in which O-rings 220, 330, 356 and 364 are all deformed to carry out their sealing function and the annular interspace between the four O-rings is dimensionally of minimal volume. It can be shown, for example, that the volume of this interspace may be as small as 0.26 cubic centimeters when the coupling is used in a 3 inch conduit.

It will be apparent that during disengagement of the coupling, the volume of liquid which resides in the annular interspace between O-rings 220, 330, 356 and 364 under the condition shown in FIG. 7 is the amount of liquid which may escape during uncoupling of the coupler and receptacle.

The principal advantages of the dry disconnect coupling of the present invention include:

Provision of a coupler poppet with a self aligning head to compensate for misalignment between the opposing poppets.

Provision of a resilient seal around the periphery of the poppet head to prevent the wetting of the interface between the opposing poppets.

Arranging the aforesaid poppet head and seal so that they may be easily replaced without removing fluid pressure from the coupler.

Arranging the periphery of the aforesaid seal with minimal clearance between it and the adjacent concentric nose seal ring.

Providing a thin wall between a face seal mounted on the adjacent concentric nose seal ring and the poppet nose seal ring to minimize the volume of residual fluid between them.

Spacing of the four seals bounding the space containing residual fluid so that the volume of said fluid is minimal.

What is claimed is:

1. A dry disconnect coupling for connecting one fluid conduit to another fluid conduit to form a continuous flow path, said coupling comprising a receptacle and a coupler, the receptacle and the coupler each being secured to a respective conduit or container, with means for securing and locking the receptacle and the coupler together to provide a connection for transfer of fluids, a poppet valve seated in each of the receptacle and the coupler for sealing a respective flow passageway therein when the coupling is uncoupled, and which valves can be unseated to permit flow of fluid through the coupling when the coupling is coupled and locked;

the poppet valve of the receptacle having resilient annular sealing means on the poppet sealing surface of the poppet valve;

a coupler body and a coupler poppet and a receptacle body and a receptacle poppet being provided with resilient annular sealing means at their interfaces, the coupler poppet being self-aligning, the arrangement of the sealing means and the coupler body and poppet and the receptacle body and poppet being such that a small interface is provided between the two poppets.

2. The dry disconnect coupling of claim 1, wherein the coupler has environmental resilient sealing means around the periphery of the interface between the coupler and the receptacle which comprises a resilient peripheral seal in an end face of a sleeve located within the coupler body, two additional resilient annular seals provided between the coupler body and the sleeve and between the sleeve and the coupler poppet to contain fluid under pressure, and when the coupler poppet is closed to a fully retracted position, a mating portion of the poppet body engages a corresponding mating portion of the sleeve and causes the sleeve to retract slightly thus disengaging the face of the resilient annular seal from contact with the receptacle and providing a small clearance between the coupler and receptacle poppets insuring no mechanical interference between the poppets; the coupler poppet being self aligning to compensate for any misalignment of the poppet faces, and the arrangement of the seals in the coupling and the small clearance between the two poppets being such that only a minimal volume of residual fluid escapes from the coupling, after uncoupling.

3. The dry disconnect coupling as claimed in claim 2, wherein the receptacle body has a spring loaded poppet, the poppet having a frusto-conical sealing surface which is seated on a matching frusto-conical seat in the receptacle body, the sealing surface having an O-ring in a groove formed therein, and the face of the poppet is flush with the adjacent face of the body when the poppet is in the closed position.

4. The dry disconnect coupling as claimed in claim 1, wherein when the coupler poppet is closed to a fully retracted position, a shoulder on the poppet body engages a corresponding register on the face seal sleeve and causes the sleeve to retract slightly thus disengaging the face O-ring seal from contact with the receptacle.

5. The dry disconnect coupling as claimed in claim 4 wherein self-alignment of the coupler poppet is achieved by not rigidly attaching the face of the coupler poppet to the poppet body.

6. The dry disconnect coupling as claimed in claim 5, wherein the face of the coupler poppet is freely located in a recess in an end of the poppet body and is loosely retained therein by means of a screw on an axial centerline so that the coupler poppet head can move axially and may tilt to align itself with the receptacle poppet as required when the poppets are in contact.

7. The dry disconnect coupling of claim 6, wherein the coupler poppet head surface is extended circumferentially to form a small flange which acts to retain an O-ring against the body of the poppet and the outside diameter of the O-ring is approximately the same as the diameter of the poppet body, and the face of the O-ring protrudes slightly from the surface of the poppet head.

* * * * *